United States Patent [19]

Benton et al.

[11] Patent Number: 4,901,068

[45] Date of Patent: Feb. 13, 1990

[54] IDENTIFICATION APPARATUS FOR OPERATING SECURE EQUIPMENT

[75] Inventors: William M. Benton, Fort Lauderdale; William Mee, Pompano Beach, both of Fla.

[73] Assignee: Moneyfax, Inc., Ft. Lauderdale, Fla.

[21] Appl. No.: 298,347

[22] Filed: Jan. 17, 1989

[51] Int. Cl.$^4$ .............................................. H04Q 1/00
[52] U.S. Cl. ........................... 340/825.31; 340/825.34; 235/382; 235/441; 235/443; 379/95
[58] Field of Search ...................... 340/825.31, 825.34, 340/825.32, 825.35; 235/375, 380, 382, 487, 492, 443, 441; 379/90, 91, 92, 95, 100

[56] References Cited

U.S. PATENT DOCUMENTS

| | | | |
|---|---|---|---|
| 4,297,569 | 10/1981 | Flies | 235/443 |
| 4,326,125 | 4/1982 | Flies | 235/443 |
| 4,620,088 | 10/1986 | Flies | 235/443 |
| 4,749,847 | 6/1988 | Despres | 235/382 |
| 4,789,859 | 12/1988 | Clarkson et al. | 235/382 |

Primary Examiner—Donald J. Yusko
Assistant Examiner—Brian S. Palladino
Attorney, Agent, or Firm—Lowe, Price, Leblanc, Becker & Shur

[57] ABSTRACT

An apparatus for turning on and off, selectively, a facsimile machine or other secured piece of equipment and processing data pertaining thereto comprises a key formed of a module and having stereo plugs extending therefrom adapted to interfit with stereo jacks in the equipment. An integrated circuit including a solid state memory is provided in the module for processing electrical signals. Data transfer is established between the integrated circuit in the module and circuitry in the equipment when the key is inserted in the equipment. In a preferred embodiment, the key is adapted to authorize and log financial transactions between parties via facsimile machines. An identification card containing information corresponding to information stored in the integrated circuit is coupled to the key by a cord.

6 Claims, 2 Drawing Sheets

IDENTIFICATION APPARATUS FOR OPERATING SECURE EQUIPMENT

TECHNICAL FIELD

This invention relates generally to security apparatus, and more particularly, to an electronic "key" containing an integrated circuit, or "chip", for enabling operation of secured equipment such as a facsimile machine.

BACKGROUND ART

Electronic equipment, such as computers, facsimile machines and copiers, often are secured against unauthorized use by requiring a mechanical key for operation thereof. The key interfits with a key receptacle provided in the equipment, and movement of the receptable in turn controls an electrical switch that enables or disables the equipment depending on the position of the key.

Another level of security applied to such equipment is carried out by an identification card containing identification data encoded on a magnetic or optical stripe thereon, stored in an integrated circuit "chip" in the card, formed on embossments of the card, or a combination thereof. In some equipment, therefore, the manufacturer of the equipment must provide, and the user must carry, both a mechanical key and identification card, to operate the equipment.

The cost of providing an integrated circuit within a conventional credit card for this purpose is high, bearing in mind that the thickness of the card is, by standard, 30 mils. However, an integrated circuit for this purpose is necessary to process identification data stored therein, together with keyboard entered data, to determine whether the user is authorized to operate the equipment. The integrated circuit additionally carries out data logging and reporting.

For example, in U.S. patent application Ser. No. 236,614, of Benton et al., filed on Aug. 23, 1988 and assigned to the assignee of this invention (Benton I), an apparatus for carrying out financial transactions at a common site or at remote sites via a facsimile machine, uses, in one embodiment thereof, a key containing an integrated circuit "chip" for turning on the facsimile machine and storing transaction data as well as a facsimile signature of the owner. As disclosed in another application of Benton et al., (Benton II) Ser. No. 236,614, filed on Aug. 23, 1988, a particular key may be retained by a cord to an identification card containing information corresponding to information stored in the chip.

Although the "keys" disclosed in the Benton et al. applications are satisfactory, the keys are relatively expensive to produce. For example, the integrated circuit in Benton II must be packaged in a relatively thin (thin enough to interfit with a key receptacle) carrier, and formed with "teeth" having a predetermined orientation on the carrier. Wiring must be routed from the integrated circuit at one end of the carrier to electrical contacts on the teeth in the region of the other end. This routing of the wiring is difficult to carry out reliably since multiple wires must traverse a relatively narrow shank portion of the key.

DISCLOSURE OF THE INVENTION

Accordingly, one object of the invention is to provide an improved integrated circuit carrier for carrying out secured equipment control.

Another object is to provide to an improved key for electronic equipment wherein there is communication of electronic data between circuitry stored in the key and circuitry within the equipment.

Still another object is to provide an improved identification and information processing module having a carrier for an integrated circuit that is durable and easily manufactured.

To satisfy the above and other objects, a data processing apparatus, in accordance with the invention, comprises a module containing an integrated circuit and having a pair of extending electrical plugs adapted to interfit with a corresponding pair of jacks provided at equipment to be secured. Data stored in the integrated circuit enable the machine and control logging of machine operation. In the preferred embodiment, the equipment is a facsimile machine used to carry out financial transactions as taught in the Benton I application.

The integrated circuit within the key includes a memory circuit for processing electrical signals, and electrical contacts positioned on the plugs are in contact with corresponding electrical contacts in the jacks provided in the equipment.

Preferably, the pair of extending plugs are in the form of three-conductor stereo plugs, together carrying six signal paths suited well to bidirectional connections. These six paths include an operating voltage to the integrated circuit in the key, the ground, data paths in two directions and chip enable as well as mode selection signals. In the preferred embodiment, the two electrical plugs and their corresponding jacks in the equipment have different diameters to establish a "polarity" to the key so that it will be inserted into the equipment with the proper alignment.

In accordance with a further aspect of the invention, an information bearing identification card is coupled to the key by a card, and the card has stored thereon data corresponding to data stored in the integrated circuit.

Still other objects and advantages of the present invention will become readily apparent to those skilled in this art from the following detailed description, wherein only the preferred embodiment of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

Figure 1:
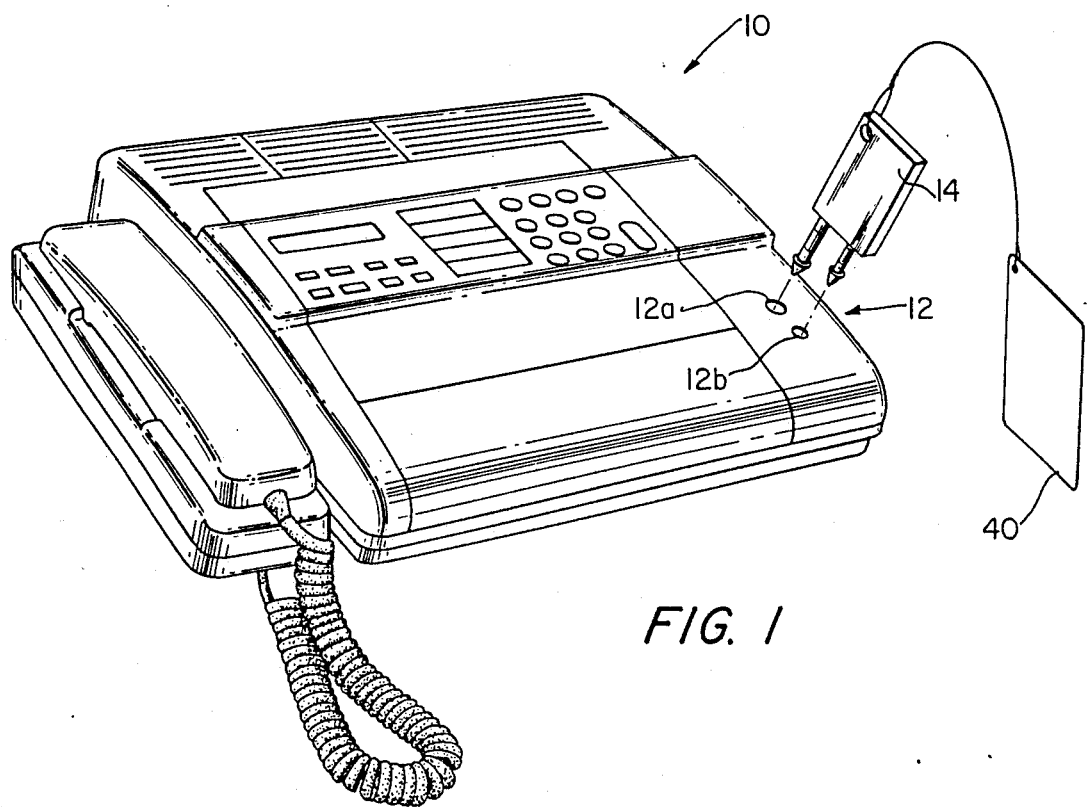
FIG. 1 is a perspective view of a piece of electronic equipment, secured by an electronic key constructed in accordance with the principles of the invention.

Referring to FIG. 1, a facsimile machine 10 therein is exemplary of any of a number of different types of equipment to be secured in accordance with the principles of the invention. The facsimile machine 10 includes, in addition to manual controls externally available to equipment of this type, an electrical receptacle 12 consisting of a pair of connector jacks 12a 12b shown more clearly in FIG. 3, adapted to receive an electronic key 14. The key 14 preferably comprises a module 16 which may be made of epoxy, and contains electronic circuitry in the form of an integrated circuit "chip". The key 14 is formed with a pair of extending electrical plugs 15a, b, which when seated in the jacks 12a, b, establishes bidirectional communications with control circuitry (not shown) inside the equipment. Details of the equipment 10, not described herein, are provided in the copending Benton I application, supra, incorporated herein by reference.

Figure 3:
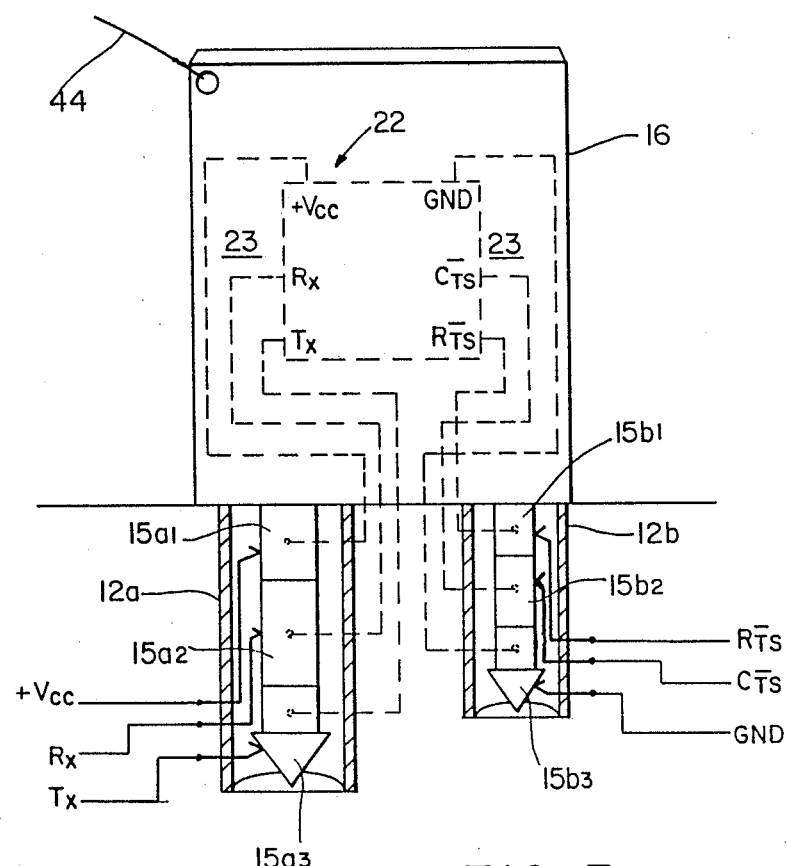
FIG. 3 is a view of the electronic key seated in a piece of secured equipment, with electronic circuitry and wiring in key, visible.

Referring to FIG. 3, plugs 15a,b preferably are comprised of conventional three-section stereo plugs. Advantageously, the plugs 15a,b and corresponding jacks 12a,b have different diameters, as shown, to enable the plug to have a "polarity". This will ensure that the user will insert the plugs into the jacks 12 with the proper alignment.

Still referring to FIG. 3, the plugs 15a,b have electrically isolated sections 15a1, 15a2, 15a3 and 15b1, 15b2, 15b3, respectively, interconnected with an integrated circuit 22, or "chip", in the module 16. Interconnecting the chip 22 and the sections of the plugs 15a,b are a number of wires 23. In the embodiment shown in FIG. 3, there are six wires which interconnect, one-to-one, the three sections of each jack 15a,b and the following six terminals of chip 22:

Vcc (operating voltage),
GND (ground),
Rx (data input port),
Tx (data output port),
CS (chip select), and
RTS (receive/transmit select).

Other numbers of wires 23 and connector plug sections required will depend upon the particular chip selected.

Figure 4:
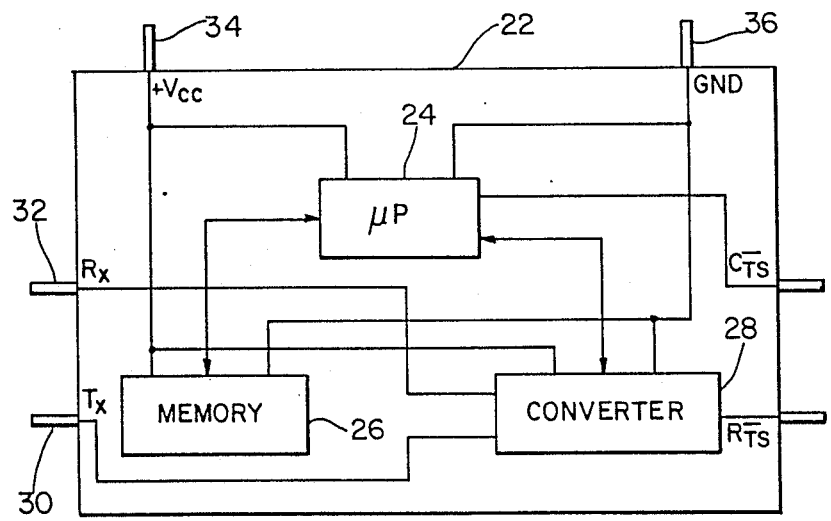
FIG. 4 is a circuit block diagram of the integrated circuit shown in the diagram of FIG. 3.

The integrated circuit 22 (See FIG. 4) contains a microprocessor 24, a memory 26, preferably in the form of an electrically erasable programmable read only memory (EEPROM) and a parallel-to-serial bit converter 28 to establish serial data ports for transmitting and receiving data. The microprocessor 24 as well as converter 28 is enabled and controlled to operate in data transmission and reception modes of operation, respectively, by the chip select (CS) and receive/transmit select (RTS) terminal, shown in FIG. 4. The integrated circuit 22 thus has terminals corresponding to the six wires 23 identified earlier.

Referring again to FIG. 2, provided within jacks 12a,b are six electrical contacts which are interconnected with corresponding sections of plugs 15a,b when the key 14 is inserted in the jacks. Wires 23, shown in FIG. 3, thus interconnect the six sections of jacks 15a,b with corresponding terminals of the chip 22 inside module 16.

Accordingly, when the plugs 12a,b of key 14 are inserted in jacks 15a,b of a piece of secured equipment, the equipment is turned on as a result of bidirectional data transfer that takes place between the integrated circuit 22 and control circuitry within the equipment, as described in the copending Benton I application. This data communication may, for example, establish that the holder of the key is authorized to use the equipment, by comparing a personal identification number, keyboard entered by the keyholder, with a corresponding number stored in the memory 26 of integrated circuit 22. Data logging by storing information transmitted by the equipment to key 14 may also be carried out by memory 26 in the manner described in the copending application. There additionally may be a facsimile signature stored in the memory 26, to be read therefrom and, ultimately, printed together with transaction summary data, described in the copending Benton I application.

Figure 2:
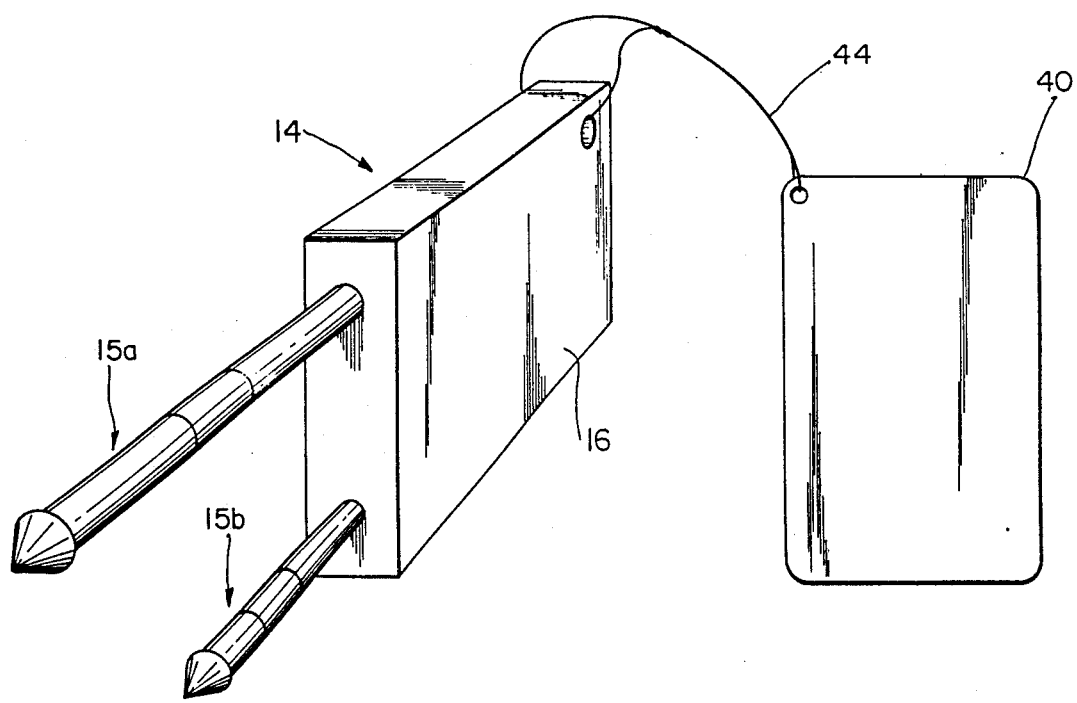
FIG. 2 is a perspective view of a key used for securing electronic equipment, together with an identification card carrying data that corresponds to data contained in the key.

Referring to FIG. 2, in accordance with another aspect of the invention, and as in Benton II, key 14 is coupled to a standard identification card 40 which may contain embossed lettering 42 as well as a magnetic stripe (not shown) storing the same or additional data. The data provided on card 40 corresponds at least with some of the data stored in memory 26 of the integrated circuit 22 in the key 14. A cord 44, formed of nylon or other suitable material, interconnects the key and card 40, to retain the two together, permanently.

Accordingly, a user may use either his credit card 40 or key 14, depending upon whether data processing, which would require use of the key, is required in a particular transaction. Furthermore, the user is able to carry out transactions using conventional embossing machines and magnetic stripe readers, which are widely proliferated throughout the world, as well as the data processing key 14 for dedicated secure equipment, with both the key and card sharing common data.

The key, being provided in the form of a module together with extending multiple-section connector plugs, and containing an integrated circuit 22, is easily manufactured, yet durable. The key furthermore is easily manipulated by the user, and there is no bending of the module that otherwise would tend to reduce the reliability of the interconnection wiring 23.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

We claim:

1. Data processing apparatus for enabling/disabling secured equipment, comprising:

a key formed of a module having at least one electrical plug extending therefrom adapted to interfit with at least one corresponding electrical jack provided at equipment to be secured, said electrical plug including a plurality of sections arranged longitudinally and electrically insulated from each other;

an integrated circuit including solid state memory means within said module for processing electrical signals;

said sections positioned on said plug to be in contact with corresponding electrical contacts in said jack;

wiring for interconnecting said sections of said plug with said integrated circuit; and wherein said integrated circuit means contains a plurality of terminals and said module contains two plugs extending therefrom, each of said plugs containing a plurality of sections, said wiring interconnecting, one-to-one, said sections and said terminals of said integrated circuit means.

2. The apparatus of claim 1, wherein said integrated circuit contains power supply and ground terminals and further contains data input and output terminals, chip select and mode select terminals, and said wiring interconnects, one to one, all said terminals of said integrated circuit means and corresponding sections of said plug.

3. The apparatus of claim 1, wherein said integrated circuit means includes an EEPROM.

4. The apparatus of claim 1, including an information bearing identification card coupled to said module, said card having stored thereon data corresponding to data stored in said integrated circuit means.

5. The apparatus of claim 4, including a cord for coupling together said card and said key.

6. The apparatus of claim 2, wherein said integrated circuit means includes input and output serial data communication ports for providing serial data to and from said key.

* * * * *